US005624514A

United States Patent [19]

Frowein

[11] Patent Number: 5,624,514

[45] Date of Patent: Apr. 29, 1997

[54] PROCESS FOR PRODUCING A SUPPORT OUTFITTED WITH AN ALARM TRIGGER OF AN ANTI-THEFT SECURITY SYSTEM

[75] Inventor: Bernhard Frowein, Schlangen, Germany

[73] Assignee: Friedrich Graf Soehne GmbH & Co. KG, Germany

[21] Appl. No.: 379,507

[22] PCT Filed: Jun. 3, 1994

[86] PCT No.: PCT/EP94/01819

§ 371 Date: Feb. 1, 1995

§ 102(e) Date: Feb. 1, 1995

[87] PCT Pub. No.: WO94/29503

PCT Pub. Date: Dec. 22, 1994

[30] Foreign Application Priority Data

Jun. 9, 1993 [DE] Germany .......................... 9308632 U

[51] Int. Cl.$^6$ .......................... B32B 31/00

[52] U.S. Cl. .......................... 156/148; 156/93; 156/269; 340/571

[58] Field of Search .......................... 156/269, 270, 156/256, 264, 148, 70, 93, 91, 92; 340/571, 572, 568; 428/916

[56] References Cited

U.S. PATENT DOCUMENTS 4,626,311 12/1986 Taylor .

FOREIGN PATENT DOCUMENTS 1413024 11/1975 United Kingdom .
WO94/29503 12/1994 WIPO .

*Primary Examiner*—David A. Simmons
*Assistant Examiner*—Linda L. Gray
*Attorney, Agent, or Firm*—McAulay Fisher Nissen Goldberg & Kiel, LLP

[57] ABSTRACT

An alarm trigger is a component part of an anti-theft security system which also comprises a detector. The alarm trigger is integrated into a support and is fastened to merchandise, preferably articles of clothing, by means of this support. In order that the alarm trigger may remain inconspicuous and so as not to impair visual appraisal of the merchandise outfitted with this alarm trigger, a process is proposed in which a continuous textile web is produced from thread material. This textile web has successive web pieces comprising textile functional strips specific to the merchandise, e.g., a woven label. Every web piece is constructed, at least partially, in two layers so as to form a cavity, this cavity being produced by portions in at least two partial steps. In the first partial step, only an initial portion of the web piece is produced at first. This initial portion has a pocket which is still open in the double-layer region. The alarm trigger is then introduced through the pocket opening into the interior of the pocket. Only then, in the second partial step, is an end portion of the web piece produced with a pocket closure which completes the pocket containing the alarm trigger so as to form a closed cavity. The textile web outfitted with the alarm triggers is then cut into its individual web pieces which form a finished combination unit with the alarm trigger.

20 Claims, 3 Drawing Sheets

PROCESS FOR PRODUCING A SUPPORT OUTFITTED WITH AN ALARM TRIGGER OF AN ANTI-THEFT SECURITY SYSTEM

BACKGROUND OF THE INVENTION a) Field of the Invention

The invention is directed to a process for textile production of a support which is outfitted with an alarm trigger of an anti-theft security system. The essential component parts of a security system of this type are an alarm trigger and a detector which responds to the approach of an alarm trigger. For example, a resonant circuit having an electric coil and a capacitor is used as an alarm trigger, while a transmitter and receiver are used for the associated detector arranged at either side of a passage through which merchandise outfitted with such alarm triggers are guided.

b) Description of the Related Art

A support serves as connection between the alarm trigger and the merchandise. In the prior art, a plastic plate was used for this purpose, the alarm trigger being integrated therein so as to be inaccessible from the outside. The plates outfitted in this way were connected in a stationary manner with the merchandise to be protected from theft via a loop of cord or the like and could only be removed again by using a special detaching device. A plate of this type impaired proper visibility of the merchandise and, in particular, showed the thief where to exercise tampering in order to detach the plate from the merchandise. Plates of this kind outfitted with alarm triggers are difficult to connect with the merchandise to be tried out without impairing the function of this merchandise, e.g., articles of apparel. For example, ready-made articles of apparel need to be tried on, but this is impeded by the attached plates.

OBJECT AND SUMMARY OF THE INVENTION

The primary object of the present invention is to develop a process of the type indicated above in which the alarm trigger is not conspicuous to the thief and the support attached to the merchandise does not impair the intended use of the merchandise with respect to viewing it or trying it out. This object is met according to the invention by the steps of the inventive process which will be discussed in detail below The first insight of the invention relates to the fact that many goods are provided with functional strips of textile specific to these goods. For example, slacks have protective cuff strips, skirts have waistbands and coats have hanger strips. Outer garments in general have woven labels containing information in symbols or alphanumeric characters about the origin of manufacture, use, care or fabric specifications of the merchandise. Such functional strips, which are provided in any case, are utilized by the invention as supports for an alarm trigger of an anti-theft security system. In the textile production method according to the invention, thread or yarn material is used to produce a web of fabric formed by successive pieces of such functional textile strips within which the alarm triggers are incorporated already during the textile production process. Every piece of textile web comprising such a functional strip is formed with two layers, at least in some areas, so as to produce a cavity in this region, the alarm trigger being inserted into this cavity during its production. For this purpose, this region is produced by portions in at least two partial steps. This can be carried out, for example, on a weaving machine or knitting machine.

In a first partial step, an initial portion of the web piece is produced with a pocket, still open, in the double-layer region. The prepared alarm trigger is then introduced through the pocket opening into the interior of the pocket. This may be done simultaneously with the textile production, i.e., during weaving or knitting, for example. However, it is more expedient to slow down or stop textile production in this phase while the process of inserting the alarm trigger is taking place. After insertion, the second partial step of textile production of the web piece is begun, in which an end portion with a pocket closure is formed in the double-layer region. In this way, the opening of the pocket is closed and a cavity is formed which encloses the alarm trigger on every side.

The textile web outfitted with the alarm triggers can now be cut into individual web pieces forming a finished combination unit with the alarm trigger. The product turned out by the textile production machine is thus already a finished combination unit containing the conventional functional strip and can therefore be fastened along with the functional strip to the merchandise in the usual way.

The combination unit according to the invention requires no special fastening means for attaching it to the merchandise. Rather, this is already provided for by the conventional fastening of the functional strip to the merchandise. Accordingly, an additional process of fastening the support of the alarm trigger to the merchandise which would otherwise be required is dispensed with. The functional strip of the combination unit according to the invention, which functional strip is visible on the merchandise, does not raise suspicions that an alarm trigger has been integrated in the merchandise by way of this functional strip. In a particularly advantageous manner, the region of such a functional strip outfitted with the alarm trigger can be concealed beneath a lining of the merchandise. This is especially useful when the functional strips are provided as woven labels, since the connecting seams between two layers of material are normally used as the location for applying a woven label. The strip region provided with the alarm trigger can then be concealed on the other side of the seam beneath a piece of fabric covering the seam. The thief cannot detect from the outside that the alarm trigger is located along a lengthening of the functional strip between the layers of material of the merchandise.

Further steps and advantages of the invention are contained in the subclaims, the following description and the drawings. The invention is explained in an embodiment example shown in the drawings.

BRIEF DESCRIPTION OF THE DRAWINGS In the drawings

DESCRIPTION OF THE PREFERRED EMBODIMENTS

Figure 1:
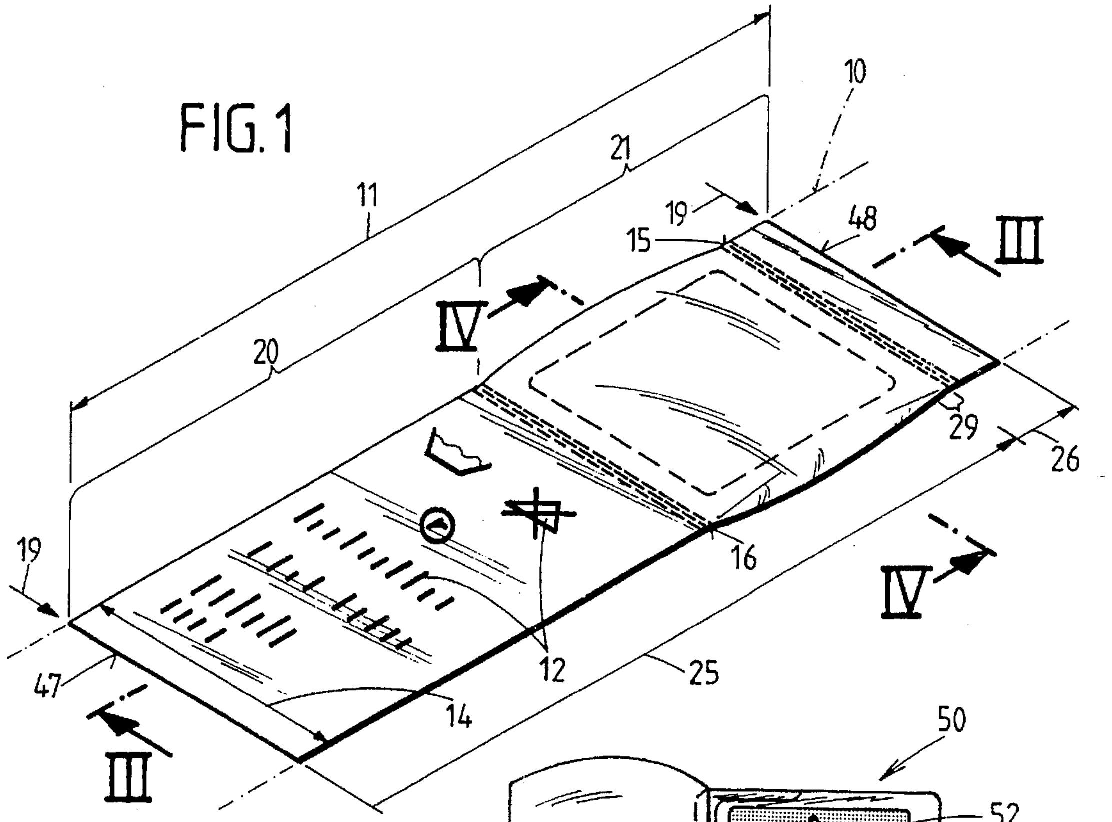
FIG. 1 shows a perspective view of a combination unit, according to the invention, formed by a woven label and an alarm trigger integrated therein.
Figure 2:
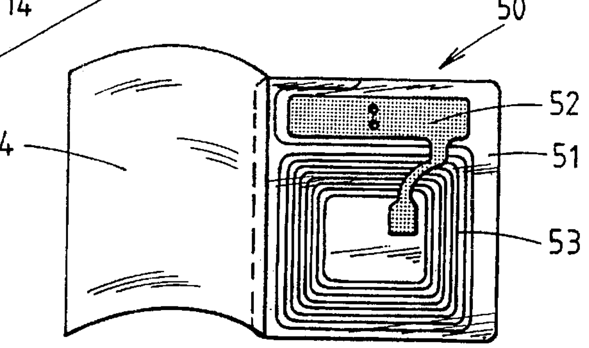
FIG. 2 shows an alarm trigger, with its component parts partially exposed.

In the embodiment example, the process according to the invention for producing a textile web 10, indicated by dashes in FIG. 1, is applied to a weaving machine 30. The textile web 10 is produced on a weaving machine 30, a portion of which is shown schematically in FIGS. 5 and 6, from weaves of yarn or thread material 31, 32, i.e., from numerous warp threads 31 and one or more weft threads 32. A continuous sequence of matching web pieces 11 which can be divided into two longitudinal portions is formed in the textile web 10 by controlled weaving of the warps 31 and wefts 32.

Figure 7:
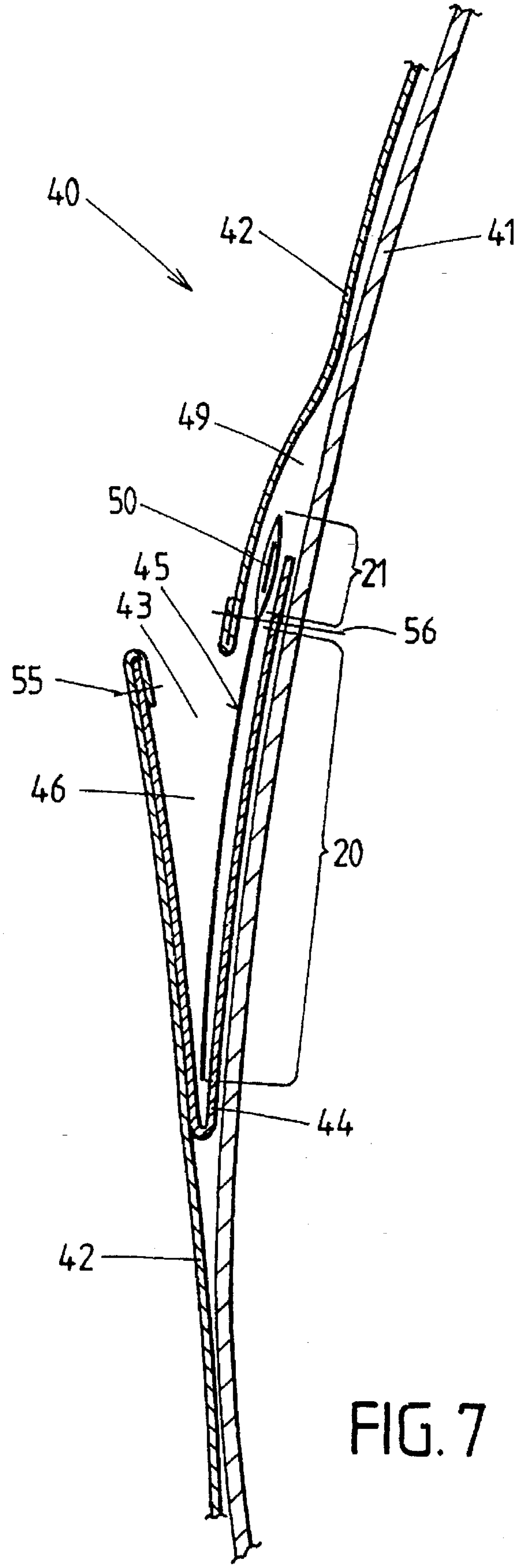
FIG. 7 is a schematic sectional view through a portion of an article of apparel in which the combination unit shown in FIG. 1 has been fastened.

One portion of the web piece 11 is a functional strip 20, in this case a woven label, specifically for the merchandise shown in FIG. 7, namely, an article of apparel 40. This woven label contains pictographic or alphanumeric data on one or both sides which are produced during the weaving by means of weaving techniques, e.g., by suitable filling threads. This functional strip 20 continues in a strip lengthening 21 which is formed in two layers at least in some regions, namely at 24. This is shown most clearly in FIG. 3 or FIG. 4. In the present instance, the two woven layers 22, 22' extend along the entire width 14 of the strip between the two longitudinal edges 13, 13' of the strip. Further, the two woven layers 22, 22' are connected with one another in the warp direction by two transverse stripes 15, 16 which, in the present case, are formed continuously in one layer. Accordingly, a cavity 23 is formed between the two woven layers 22, 22' which is enclosed on all sides by the connections at the longitudinal edges 13, 13' of the strip and the transverse stripes 15, 16.

This cavity serves to receive a flat body 50 constructed in a conventional design as an alarm trigger. This body will be referred to in the following as "alarm trigger". In this embodiment example, it is formed by a base sheet or foil 51 on which is arranged an electric circuit with its component parts 52, 53. In the present case, these circuit parts include a capacitor 52 and an inductive resistor 53 which together form a resonant circuit. A cover foil 54 is glued over the base foil 51. It will be understood that the alarm trigger 50 could also have a different construction or could operate on other physical principles. It is essential only that the alarm trigger 50 be capable of activating a detector when the merchandise provided with this alarm trigger 50 enters the response range of the detector. Moreover, it is useful if the alarm trigger 50 can be disabled without physically touching it in case a monitoring of the merchandise outfitted with this alarm trigger is not desired. This can be effected by means of deliberate, noncontacting destruction of a crucial electrical circuit point in the alarm trigger 50.

Figure 3:
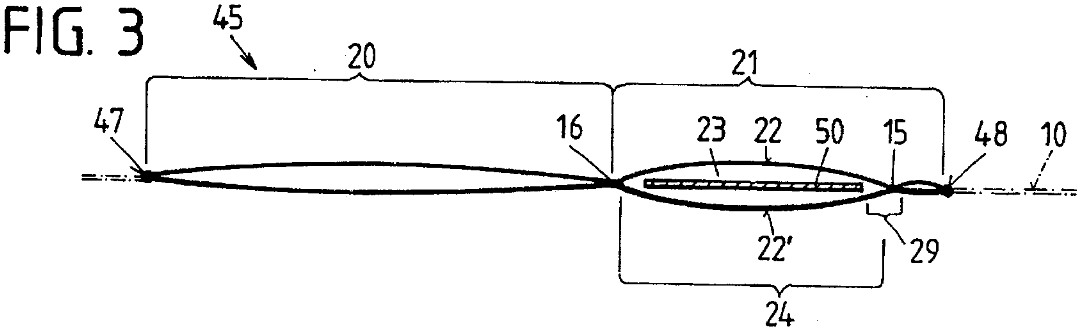
FIG. 3 shows a longitudinal section through the combination unit shown in FIG. 1 along section line III—III in FIG. 1.

The actual functional strip 20 adjoining the strip lengthening 21 can likewise be constructed with two layers as shown in FIG. 3. However, the double layer in this region is not used, whereas the cavity 23 in the adjoining strip lengthening 21 serves to receive the alarm trigger 50 so as to prevent it from falling out. The borders of the cavity 23 at 13, 13', 15 and 16 need not be completely closed. It is sufficient within these zones to pass through a thread between the two woven layers 22, 22' at points whose distance from one another is smaller than the dimensions of the inserted alarm trigger 50. The purpose of the cavity 23 consists only in positioning the alarm trigger 50 at the functional strip 20 in such a way that it cannot fall out. The alarm trigger 50 is inserted into the cavity 23 during weaving, which is explained in more detail with reference to FIGS. 5 and 6.

Figure 5:
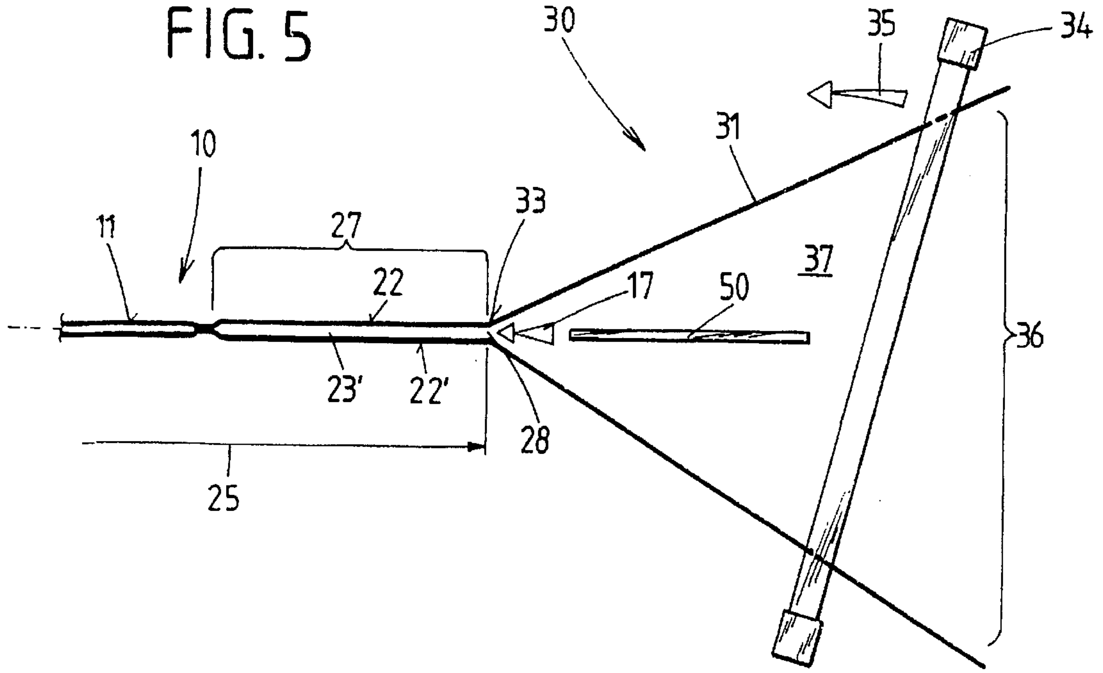
FIGS. 5 and 6 show a schematic side view and top view, respectively, of a substantial portion of a weaving machine in which the combination unit according to the invention is produced.
Figure 6:
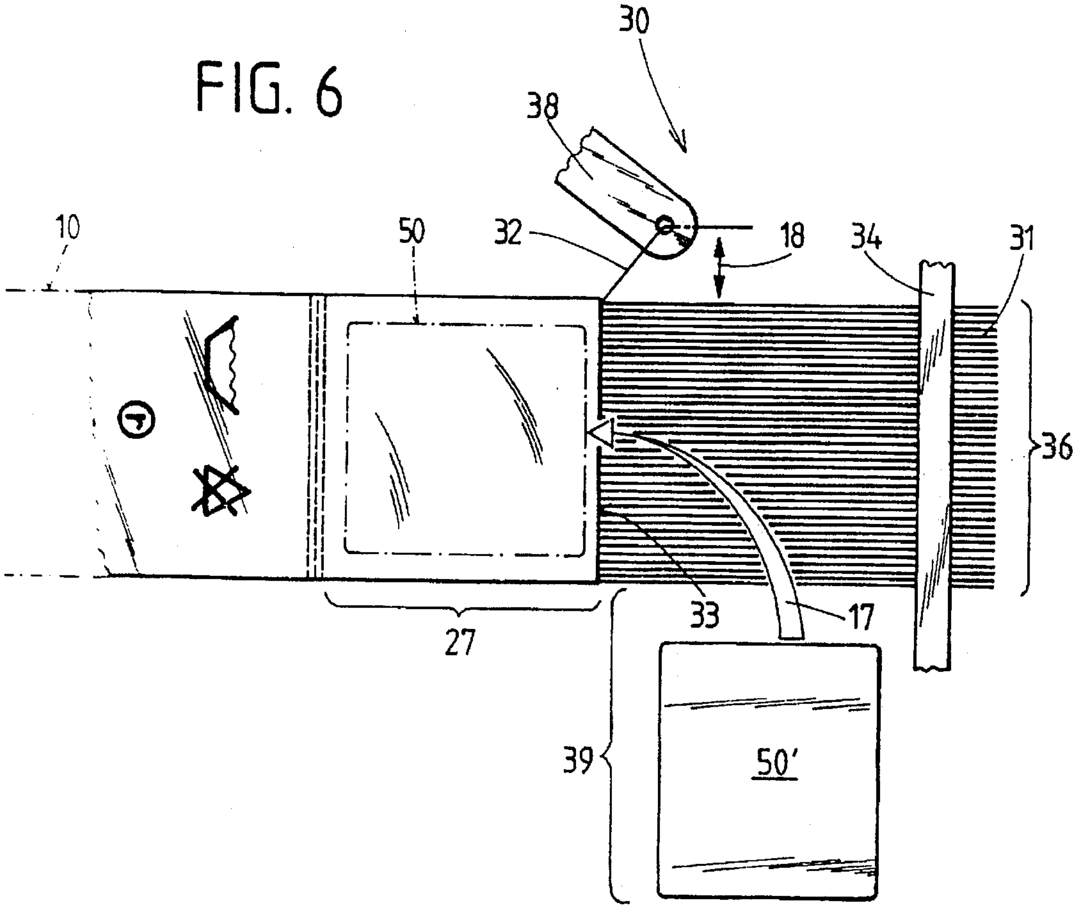

FIGS. 5 and 6 show that phase of the weaving production of the textile web 10 in which an initial portion 25, hereinafter "starting portion", has first been produced from a web piece 11. In addition to the functional strip 20, this starting portion 25 also comprises a substantial piece of the adjoining strip lengthening 21 as will be seen from FIG. 1. A considerable piece of the double-layer region 24 with its two woven layers 22, 22' has already been formed. In so doing, an open pocket 27 is formed in the double-layer region 24, the opening 28 of this pocket being located at the decisive weft tying point 33 of the weaving loom 30. At this weft tying point 33, the weft is beaten up by a loom reed 34 which swivels in the movement direction indicated by the arrow 35. In the present case, a needle is used as weft insertion means 38. When the loom reed 34 is located at a distance from the weft tying point 33, the warp threads 31 are spread apart to form the shed 36 as shown in FIG. 5, specifically in such a way that the pocket opening 28 between the upper woven material 22 and lower woven material 22' opens toward the interior 37 of the shed 36. At the same time or before continuing the weaving, a special work phase takes place.

A movement 17 for inserting the alarm trigger 50 into the pocket interior 23' now takes place. A gripper, not shown in more detail, is advisably used for this purpose and is moved along a curve or circle in the manner of the weft insertion means 38 mentioned above. The alarm trigger is first located in position 50'. The trigger has been moved into this position by a feeding device, not shown in more detail, and is located in the region 39 alongside the spread weave shed 36, shown in FIG. 6. It is grasped in this location by the gripper which moves it into the interior 37 of the shed through the lateral opening of the shed. In this movement phase, at least one movement component acts in the weft insertion direction indicated by arrow 18, i.e., transversely to the run of the warp threads 31. In the end phase of the insertion 17, however, there is at least one movement component running in the warp direction which guides the trigger 50 through the opening 28 into the interior 23' of the pocket. The inserted position 50 in the interior 23 of the pocket is indicated in FIG. 6 in dash-dot lines. As can be seen from FIG. 6, the alarm trigger disappears in the inserted position 50 along its entire length in the interior 23' of the pocket. At all events, it does not project out of the pocket opening 28.

The weaving may then resume. The end portion of the web piece designated by 26 in FIG. 1 is then finished, wherein, most importantly, a pocket closure 29 is effected in the double-layer region 24. The pocket 27 shown in FIGS. 5 and 6 with the alarm trigger 50 located therein is accordingly completed so as to form a closed cavity 23. In so doing, the single-layer second transverse strip 15 producing a connection between the two woven layers 22, 22' is also formed.

Thus, the finished woven product turned out by the loom is a textile web 10 in which each successive web piece 11 is outfitted with an alarm trigger 50 so as to form a connected sequence of combination units 45. The textile web 10 is then severed at the transition point 19 between the individual web pieces 11. The cut edges are welded together with this severing cut 19 resulting in fused edges 47, 48 at both ends of the combination unit 45 to prevent the woven material from fraying. The combination units 45 are separated by the severing cuts 19 and can then be fastened to the associated merchandise 40. This is explained more fully in relation to an embodiment example shown in FIG. 7.

Figure 4:
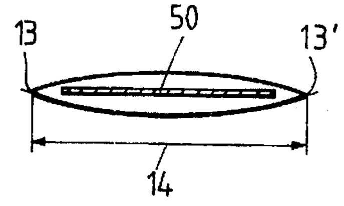
FIG. 4 shows a cross section through the combination unit along section line IV—IV shown in FIG. 1.

As was already mentioned above, FIG. 7 shows a cutaway view of an article of apparel 40 with upper fabric 41 and under-fabric 42. The under-fabric 42 is slit at location 43 in order to produce an inner pocket in the clothing at this point. For this purpose, a pouch 44 is inserted between the two portions of under-fabric 42, the two opposite walls of the pouch being fastened by means of the two seams 55, 56 indicated in FIG. 7. One seam 56 serves at the same time to connect the prepared combination unit 45 according to the invention with the article of apparel 40. In so doing, the strip region 21 outfitted with the trigger 50 is inserted into the intermediate space between the upper fabric 41 and a portion of the under-fabric 42 as an insert as can be seen from FIG. 7. Accordingly, this strip region 21 is invisible from the outside. The seam 56 is placed approximately in the region of the single-layer transverse stripe 16 which is shown in FIG. 4 and has already been discussed. The actual functional strip 20, i.e., the woven label, is accordingly arranged in the interior 46 of the pouch so as to be visible. This visible portion does not reveal the fact that the combination unit 45 designed in the special manner according to the invention is provided in the article of apparel 40 in the present instance. A thief cannot perceive that the article of apparel 40 is provided with anti-theft protection.

It will be understood that such combination units 45 could also be attached to other kinds of merchandise, e.g., leather bags. Particularly when the dimensions of the alarm trigger 50 are small, this alarm trigger 50 could also be incorporated in the visible region of a functional strip, e.g., in the region of the actual woven label 20. The double-layer construction is then provided in the region of this woven label 20 and the strip lengthening 21 described above can be omitted.

Naturally, any other type of functional strip can be used instead of a woven label 20, e.g., a waistband, a protective cuff strip on pants or a clothing hanger strip.

While the foregoing description and drawings represent the preferred embodiments of the present invention, it will be obvious to those skilled in the art that various changes and modifications may be made therein without departing from the true spirit and scope of the present invention.

What is claimed is:

1. A process for producing a textile functional strip outfitted with an alarm trigger for use with an anti-theft security system, the textile functional strip outfitted with the alarm trigger being adapted for attaching to merchandise and the anti-theft security system including a detector which is arranged in a region through which the merchandise must pass and which responds when the alarm trigger is passed through the region, the process comprising the steps of:

a) producing a continuous textile web, said continuous textile web having successive zones and during production;

aa) constructing each said successive zone as two layers in at least one area;

bb) forming a pocket from said two layers in each of said successive zones, each pocket having an interior and a pocket opening;

cc) inserting an alarm trigger through each pocket opening into the interior of the pocket; and dd) forming a pocket closure at each pocket opening to maintain the alarm trigger within the interior of the pocket;

b) cutting the continuous textile web at cutting points to separate said successive zones into individual textile functional strips.

2. The process according to claim 1 further comprising the step of interrupting steps a) through bb), and step b) before performing step d).

3. The process according to claim 1 further comprising the step of welding each said individual textile functional strip at the cutting points.

4. The process according to claim 1 further comprising the step of attaching each said textile functional strip to merchandise;

each said textile functional strip comprising a lengthened region and said pocket, said pocket including the alarm trigger, at least some of said lengthened region being concealed by component parts of the merchandise.

5. The process according to claim 4 further comprising the step of placing a fastening means for attaching the individual textile functional strip to the merchandise, each said fastening means being arranged on each said individual textile functional strip between the lengthened region and the pocket.

6. The process according to claim 1 wherein the pocket opening faces in a warp direction and is located at a weft tying point, and, before the introduction of the alarm trigger, spreading threads apart to form a shed having an apex and an interior until the pocket opening located at the apex of the shed opens toward the interior of the shed.

7. The process according to claim 6 further comprising the steps of guiding the alarm trigger into the interior of the shed from a location laterally adjacent to the shed by at least one movement component directed in a weft direction and then moving the alarm trigger through the pocket opening into the interior of the pocket by at least one movement component facing in the warp direction.

8. The process according to claim 6 further comprising the step of guiding the alarm trigger into the interior of the pocket along a curved path through a lateral opening of the shed.

9. The process according to claim 1 wherein step cc) comprises the steps of grasping the alarm trigger with a gripper, transferring the alarm trigger into the interior of the pocket, and releasing the alarm trigger.

10. The process according to claim 1 wherein each said individual textile functional strip is formed as a protective band which is fastened in a lower region of merchandise selected from the group consisting of slacks and skirts.

11. The process according to claim 1 wherein each said individual textile functional strip is formed as a waistband which is fastened in an upper region of merchandise selected from the group consisting of slacks and skirts.

12. The process according to claim 1 wherein each said individual textile functional strip is formed as a hanger strip for articles of apparel.

13. The process according to claim 1 wherein each said textile functional strip includes a label.

14. The process according to claim 13 wherein the label contains information in symbols or alphanumeric characters relating to the merchandise.

15. The process according to claim 1 wherein said textile web and said two layers are knit material.

16. The product produced by the process of claim 10.

17. The product produced by the process of claim 11.

18. The product produced by the process of claim 12.

19. The product produced by the process of claim 13.

20. The product produced by the process of claim 14.

* * * * *